United States Patent [19]

Pickering et al.

[11] 4,110,294

[45] Aug. 29, 1978

[54] PROCESSING AIDS FOR HIGH TEMPERATURE POLYMERS

[75] Inventors: Timothy L. Pickering, Blauvelt; James I. Hendrickson, New Windsor, both of N.Y.

[73] Assignee: Ciba-Geigy Corporation, Ardsley, N.Y.

[21] Appl. No.: 675,425

[22] Filed: Apr. 9, 1976

Related U.S. Application Data

[63] Continuation of Ser. No. 458,495, Apr. 8, 1974, abandoned, which is a continuation of Ser. No. 303,193, Nov. 2, 1972, abandoned.

[51] Int. Cl.$^2$ .......................... C08K 5/34; C08L 79/08
[52] U.S. Cl. .......................... 260/30.2; 260/32.6 NT; 528/170; 528/322
[58] Field of Search .................. 260/32.6 NT, 78 TF, 260/78 UA, 30.2, 78, 47

[56] References Cited

U.S. PATENT DOCUMENTS

| | | | |
|---|---|---|---|
| 3,406,148 | 10/1968 | Sambeth et al. | 260/78 TF |
| 3,528,950 | 9/1970 | Lubowitz | 260/78 TF |
| 3,533,996 | 10/1970 | Grundschober et al. | 260/78 TF |
| 3,772,254 | 11/1973 | Jones et al. | 260/32.6 NT |
| 3,781,240 | 12/1973 | Lubowitz | 260/32.6 NT |

FOREIGN PATENT DOCUMENTS

| | | | |
|---|---|---|---|
| 1,537,135 | 7/1968 | France | 260/78 UA |
| 1,810,467 | 7/1970 | Fed. Rep. of Germany | 260/78 UA |

*Primary Examiner*—Allan Lieberman
*Attorney, Agent, or Firm*—Luther A. R. Hall

[57] ABSTRACT

This invention provides a means for aiding in the processing of polyimide or polyamide-imide resins containing olefinic unsaturated end groups by use of unsaturated imide or their corresponding amide acid compounds which act as a flux for the resin. These fluxing compounds enhance the flow of these resins during processing and also facilitates the removal of volatiles thereby permitting the preparation of dense, low void content objects of high mechanical strength.

10 Claims, No Drawings

PROCESSING AIDS FOR HIGH TEMPERATURE POLYMERS

This is a continuation of application Ser. No. 458,495 filed on Apr. 8, 1974, now abandoned, which is a continuation of application Ser. No. 303,193, filed on Nov. 2, 1972, now abandoned.

BACKGROUND OF THE INVENTION

This invention relates to the use of olefinic unsaturated imides as processing aids for high temperature polymers.

Previously known polyimide and polyamide-imide resins suffer from their inability to be processed thermally at elevated temperatures. These resins are often characterized by their insolubility and infusibility properties which make them practically impossible to process with conventional plastics processing equipment. As a consequence, the resins are usually handled in the form of their precursor polyamide acids. The precursor materials, while suitable for the preparation of thin films prepared from solution, cannot be handled by autoclaving and press molding techniques without great difficulty. The polyamide acid forms of both the polyimide and polyamide-imide resins undergo cyclization to the imide form during processing, giving rise to poorly consolidated and void filled parts of low mechanical strength.

The unsaturated imide containing fluxes or processing compounds of this invention act as plasticizers for polyimide or polyamide-imide resins containing olefinic unsaturated end groups as well as for the precursor amide acid form of both the polyimide and polyamide-imide resins. These fluxes greatly enhance the flow of these materials and also facilitate the removal of volatile by-products, thereby permitting the preparation of dense, low void content objects of high mechanical strength. These desirable parts can be made using any of the conventional plastic processing methods such as autoclave molding, vacuum bag molding, compression, transfer and injection molding. Another desirable aspect of the invention is that the unsaturated imide fluxes are incorporated into the backbone of the polyimide or polyamide-imide during processing and thus do not volatilize nor exude from the resin to any appreciable extent during processing or in use service.

DETAILED DISCLOSURE

This invention provides compositions containing polyimide or polyamide-imide resins containing olefinic unsaturated end groups or their corresponding polyamide-acid precursors and an olefinic unsaturated imide fluxing or processing compound which is added to said resins in order to render them more easily processable.

More specifically, the olefinic unsaturated imide processing agents can be represented by the formula

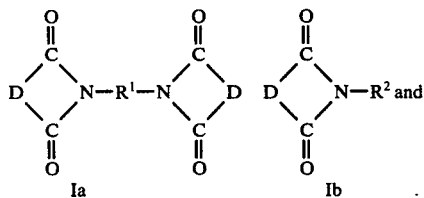

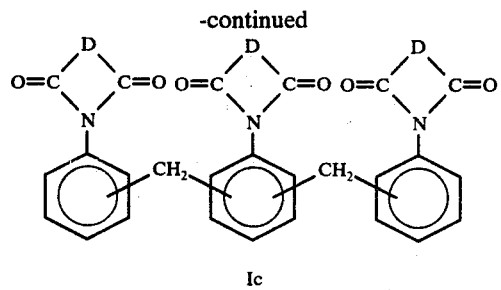

wherein $R^1$ is a divalent organic radical containing at least 2 carbon atoms, which may be selected from aromatic, aliphatic, cycloaliphatic, heterocyclic, combinations of aromatic and aliphatic, bridged organic radicals wherein the bridge is oxygen, nitrogen sulfur, silicon or phosphorous and substituted groups thereof;

$R^2$ is a monovalent organic radical which may optionally contain olefinic unsaturation;

D is a divalent radical containing olefinic unsaturation having the formula

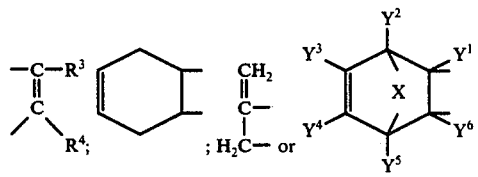

wherein $R^3$ is hydrogen, methyl, bromo or chloro;

$R^4$ is hydrogen, bromo or chloro;

$Y^1$–$Y^6$ inclusive is selected from the group consisting of hydrogen, bromine, chlorine, nitro, phenyl, alkyl of from 1 to 6 carbon atoms;

X is carbonyl, oxygen, sulfur, chloro or bromo substituted methylene, alkylidene of from 1 to 6 carbon atoms, and benzylidene.

The divalent radical $R^1$ is derived from a diprimary diamine.

More particularly, the divalent organic radicals as represented by $R^1$ are alkylene groups containing from 2 to 12 carbon atoms; cycloalkylene groups containing from 4 to 6 carbon atoms; arylene groups selected from ortho, meta or para phenylene, xylylene, tolylene, biphenylene, naphthylene; substituted arylene groups of the formula

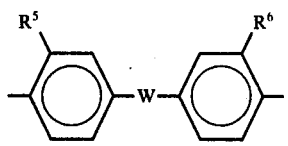

wherein W is sulfur, carbonyl, —SS, —O, sulfonyl, $R^5$ and $R^6$ are independent and each is hydrogen, chloro bromo, (lower)alkyl group containing from 1 to 5 carbon atoms or a (lower)alkoxy group containing from 1 to 5 carbon atoms; or a group having the formula

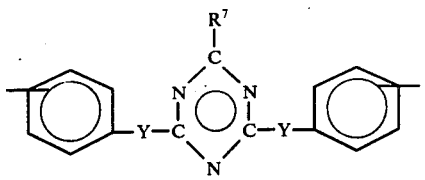

where Y is a covalent bond or NH- and $R^7$ is phenyl, piperidino, H, diphenylamino, or a di(lower alkyl)amino group.

Typical of the monovalent organic radicals represented by $R^2$ are alkyl of from 1 to 8 carbon atoms; alkenyl of from 3 to 18 carbon atoms; aryl such as phenyl and naphthyl; alkaryl such as tolyl and xylyl; substituted phenyl groups such as nitrophenyl, aminophenyl and the like.

The radical D is derived from an ethylenic anhydride of the formula

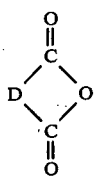

wherein D is as defined hereinbefore which may be, for example, maleic anhydride, chloromaleic anhydride, citraconic anhydride, tetrahydrophthalic anhydride, itaconic anhydride and the like; and the products of Diels-Alder reaction between a cyclodiene of the formula

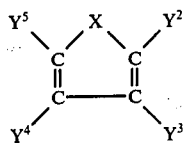

and an anhydride of the formula

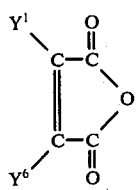

wherein $Y^1$-$Y^6$ inclusive and X are as defined hereinbefore.

The olefinic unsaturated imide fluxes of the formulas Ia, Ib and Ic, are prepared by first forming the amide-acid by reacting amines of the formulas

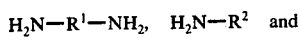

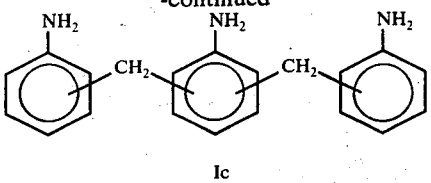

Ic wherein $R^1$ and $R^2$ are as defined hereinbefore with an unsaturated anhydride of formula II, in an inert solvent such as chloroform at about 25° C with subsequent cyclization and dehydration of the amide-acid to the imide by thermal or chemical means. Thus, these processing aids may be imidized by heating the amide-acids at a temperature sufficient to effect imidization while removing the water formed by azeotropic distillation, e.g., by refluxing in toluene at 110° C, or adding acetic anhydride pyridine mixture to the amide-acid in an inert solvent such as chloroform, dioxane, tetrahydrofuran and the like.

Illustrative of the diprimary diamines which are suitable for preparing the flux compounds of the present invention and from which $R^1$ is derived include 4,4'-Diamino-2,2'-sulfonediphenylmethane
Ethylenediamine
Benzoguanamine
m-Phenylenediamine
p-Phenylenediamine
Benzidine
4,4'-Diaminodiphenyl sulfide
4,4'-diaminodiphenyl disulfide
4,4'-Diaminodiphenylsulfone
3,3'-Diaminodiphenylsulfone
4,4'-Diaminodiphenyl ether
4,4'-Diaminobenzophenone
1,5-Diaminonaphthalene
3,3'-Dimethyl-4,4'-diaminobiphenyl
3,3'-Dimethoxybenzidine
Toluenediamine
Oxybis(o-methoxyaniline)
Oxybis(o-methylaniline)
m-Xylylenediamine
p-Xylylenediamine
Bis-(4-aminocyclohexyl)methane
Hexamethylenediamine
Heptamethylenediamine
Octamethylenediamine
Nonamethylenediamine
Decamethylenediamine
3-Methyl-heptamethylenediamine
4,4'-Dimethylheptamethylenediamine
2,11-diaminododecane
2,2-Dimethylpropylenediamine
3-Methoxyhexamethylenediamine
2,5-Dimethylhexamethylenediamine
2,5-Dimethylheptamethylendiamine
5-Methylnonamethylenediamine
1,4-Diaminocyclohexane
1,12-Diaminooctadecane
2,5-Diamino-1,3,4-oxadiazole
$H_2N(CH_2)_3O(CH_2)_2O(CH_2)_3NH_2$
$H_2N(CH_2)_3S(CH_2)_3NH_2$
$H_2N(CH_2)_3N(CH_3)(CH_2)_3NH_2$
2-diphenylamino-4,6-bis(m-aminoanilino)-s-triazine
2-amino-4,6-bis(m-aminoanilino)-s-triazine 2-phenyl-4,6-bis(p-aminophenyl)-s-triazine
2-phenyl- 4,6-bis(m-aminophenyl)-s-triazine
2-phenyl-4,6-bis(4'-aminoanilino)-s-triazine
2-phenyl-4,6- bis(3'-aminoanilino)-s-triazine
2-anilino-4,6-bis(4'-aminoanilino)-s-triazine
2-(N-methylanilino)-4,6-bis(3'-aminoanilino)-s-triazine
2-dimethylamino-4,6-bis(3'-aminoanilino)-s-triazine
2-diphenylamino-4,6-bis(2'-aminoanilino)-s-triazine
2-diphenylamino-4,6-bis(4'-aminoanilino)-s-triazine
2-phenyl-4,6-bis(2'-methyl-4'-aminoanilino)-s-triazine
2-diphenylamino-4,6-bis(3'-aminocyclohexylamino)-s-triazine
2-piperidino-4,6-bis(3'-aminoanilino)-s-triazine
2H, 4,6-bis(3'-aminoanilino)-s-triazine
2-amino-4,6-bis(3'-aminoanilino)-s-triazine
2-diphenylamino-4,6-bis[4-(p-aminophenoxy)anilino]-s-triazine These processing aids may be incorporated into the resin any time prior to the final processing thereof. Thus, the unsaturated imide fluxes may be added to the resins before, during and after polymerization or to the resin powder, which resin powder may be in the imidized form or amide-acid precursor form, by mechanical mixing methods known in the art.

These processing aids may be incorporated into the resinous material in amounts ranging from 2% to about 50% by weight based on the weight of the resin. The preferred range is from about 10% to about 35% by weight based on the weight of the resin.

It has also been found that the precursor amide acid form of the unsaturated imide fluxes also acts to reduce the melting and softening temperature of the resins during processing. The precursor amide-acid flux is converted to the imide form during processing and/or final cure of the resin. The precursor amide-acid form of the unsaturated imide flux can be added to the resins in the same manner and in the same amounts as the unsaturated imide form of the flux.

The resinous materials which may be beneficially enhanced by the addition of the unsaturated imide fluxes or their corresponding amide-acid precursors include a polyamide-acid of the formula

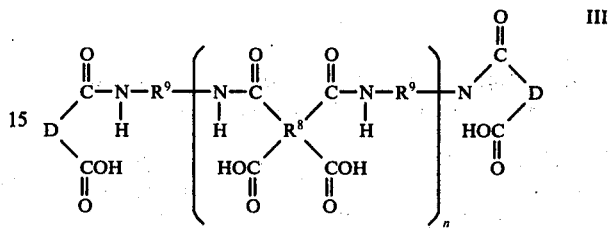

III and its corresponding polyimide of the formula

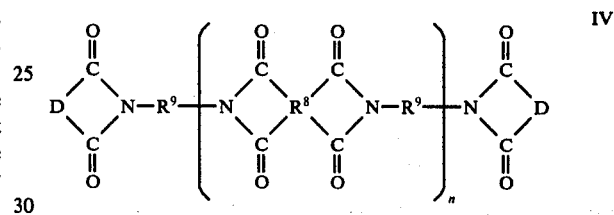

IV as well as a polyamide-amide acids of the formula

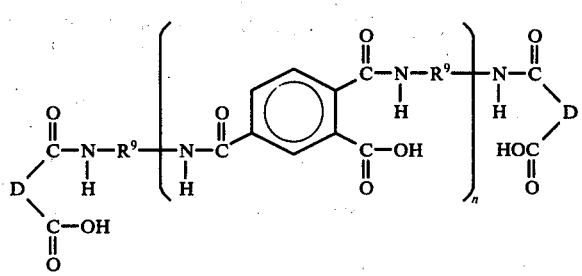

V and

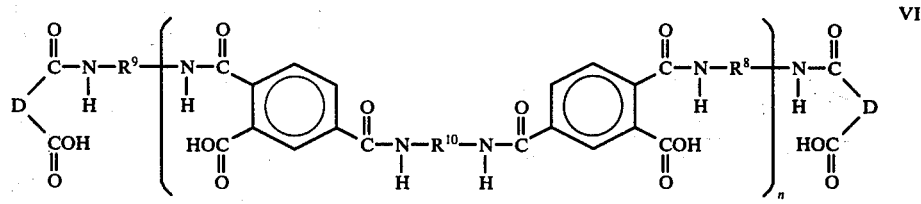

VI and their respective corresponding polyamide-imide of the formulas

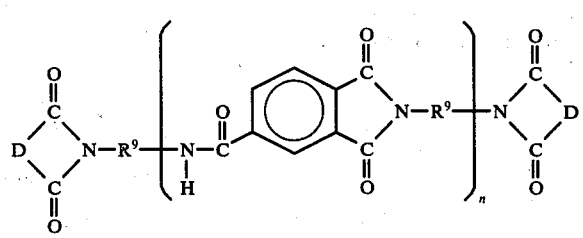

VII and

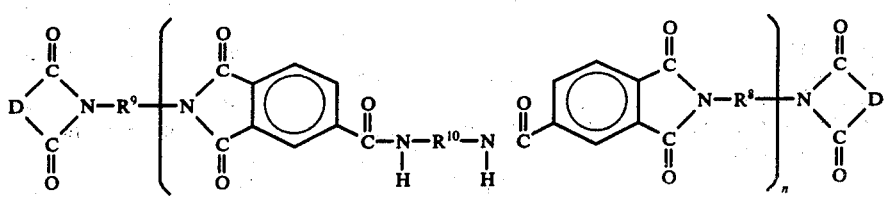

wherein

R[8] is a tetravalent aliphatic cycloaliphatic, aromatic or heterocyclic radical containing at least 2 carbon atoms;

R[9] and R[10] are the same or different and each is an alkylene group containing from 2 to 12 carbon atoms; a cycloalkylene group containing from 4 to 6 carbon atoms; an arylene group selected from phenylene, xylylene, tolylene, biphenylene, naphthylene, substituted arylene group of the formula

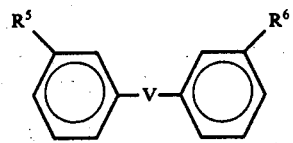

wherein V is sulfur, carbonyl, —NH, -N-(lower)alkyl, —SS, —O—, -N-phenyl, sulfonyl, an alkylene group of from 1 to 3 carbon atoms, a di(lower)alkyl silyl group containing from 1 to 5 carbon atoms, a diphenyl silyl group, —P(O) (lower)alkyl said lower alkyl containing from 1 to 5 carbon atoms, —N=N—,

R[5] and R[6] are independent and each is hydrogen, chlori, bromo, lower alkyl containing from 1 to 5 carbon atoms, alkoxy containing from 1 to 5 carbon atoms or a group having the formula

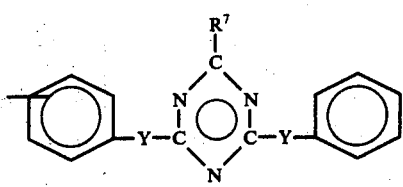

where Y is a covalent bond or —NH, and R[7] is phenyl, piperidino, H, diphenylamino or di(lower)alkyl amino;

n is an integer of from 1 to 100 and more preferably from 1 to 15;

D is a divalent radical containing olefinic unsaturation selected from the group having the formula

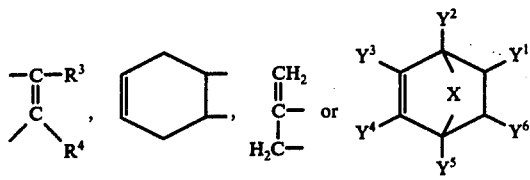

wherein R[f], R[4], Y[1] to Y[6] inclusive and X are as hereinbefore defined.

More particularly, R[8] is derived from a dianhydride characterized by the general formula

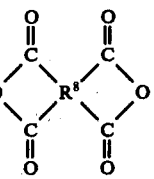

and may be a straight or branched chain saturated aliphatic radical having from 2 to 4 carbon atoms, a saturated alicyclic radical having 5 to 12 carbon atoms in the ring, a heterocyclic radical containing at least one of the atoms of O, N, and S, and an aromatic group containing at least one ring of six carbon atoms, said ring characterized by benzenoid unsaturation, the four carbonyl groups being attached directly to separate carbon atoms in a six membered benzenoid ring of the R[8] radical and each pair of carbonyl groups being attached to adjacent carbon atoms in a ring of the R[8] radical and may be characterized by the following structures

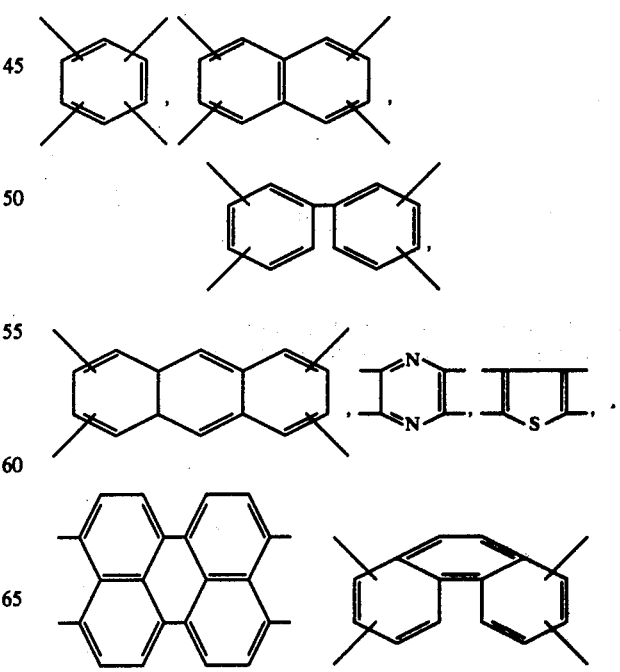

-continued

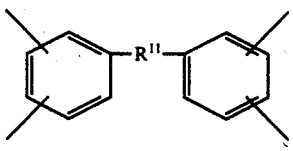

wherein R[11] is selected from the group consisting of

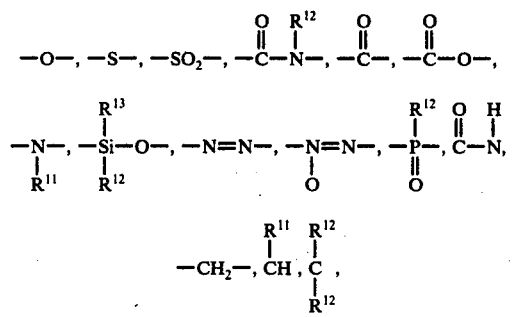

wherein R[12] and R[13] are alkyl of from 1 to 6 carbon atoms or aryl, such as phenyl, and substituted groups thereof; and radicals having the structure

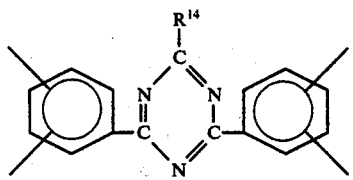

wherein R[14] is hydrogen, aryl such as phenyl and naphthyl; amino, diarylamino such as diphenylamino, dialkylamino such as dimethyl or diethylamino and the like. These latter type triazine based dianhydrides are described in greater detail in an application filed on May 1, 1972, Ser. No. 248,838 (Case GC 600).

In these dianhydrides every carbonyl group is attached directly to a separate carbon atom of the aromatic radical, the carbonyl groups being ortho or peri to each other so that 5- or 6- membered anhydride rings are formed respectively.

The preferred aromatic dianhydrides are those in which the carbon atoms of each pair of carbonyl groups are directly attached to ortho carbon atoms in the R group to provide a 5-membered ring as follows:

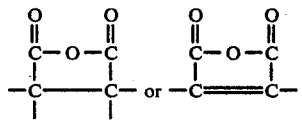

Suitable dianhydrides that are used alone or in a mixture are, among others;

Pyromellitic dianhydride
2,3,6,7-Naphthalenetetracarboxylic dianhydride
3,3′4,4′-Diphenyltetracarboxylic dianhydride
1,2,5,6-Naphthalenetetracarboxylic dianhydride
2,2′3,3′-Diphenyltetracarboxylic dianhydride
2,2-Bis-(3,4-dicarboxyphenyl)propane dianhydride
Bis-(3,4-dicarboxyphenyl)sulfone dianhydride
3,4,9,10-Perylenetetracarboxylic dianhydride
Bis-(3,4-dicarboxyphenyl)ether dianhydride
Ethylenetetracarboxylic dianhydride
Naphthalene-1,2,4,5-tetracarboxylic dianhydride
Naphthalene-1,4,5,8-tetracarboxylic dianhydride
Decahydronaphthalene-1,4,5,8-tetracarboxylic dianhydride
4,8-Dimethyl-1,2,3,5,6,7-hexahydronaphthalene-1,2,5,6-tetracarboxylic dianhydride
2,6-Dichloronaphthalene-1,4,5,8-tetracaboxylic dianhydride
2,7-Dichloronaphthalene-1,4,5,8-tetracarboxylic dianhydride
2,3,6,7-tetrachloronaphthalene-1,4,5,8-tetracarboxylic dianhydride Phenanthrene-1,8,9,10-tetracarboxylic dianhydride
Cyclopentane-1,2,3,4-tetracarboxylic dianhydride
Pyrrolidine-2,3,4,5-tetracarboxylic dianhydride
Pyrazine-2,3,5,6-tetracarboxylic dianhydride
2,2-Bis-(2,3-dicarboxyphenyl)propane dianhydride
1,1-Bis- (2,3-dicarboxyphenyl)ethane dianhydride
1,1-Bis(3,4-dicarboxyphenyl)ethane dianhydride
Bis-(2,3-dicarboxyphenyl)methane dianhydride
Bis-(3,4-dicarboxyphenyl)methane dianhydride
Benzene-1,2,3,4-tetracarboxylic dianhydride
1,2,3,4-Butanetetracarboxylic dianhydride
Thiophene-2,3,4,5-tetracarboxylic dianhydride
3,4,3′,4′-Benzophenonetetracarboxylic dianhydride
Azobenzenetetracarboxylic dianhydride
2,3,4,5-Tetrahydrofuran dianhydride
2-phenyl-4,6-bis(3′,4′-dicarboxyphenyl)-s-triazine dianhydride
2-diphenylamino-4,6-bis(3′,4′-dicarboxyphenyl)-s-triazine dianhydride The radicals R[9] and R[10] are derived from organic diprimary diamines, R[9] and R[10] include within their scope those diprimary diamines from which R[1] is derived as well as the following additional diamines 4,4′-Diaminodiphenylpropane
4,4′-Diaminodiphenylmethane
Bis-(4-aminophenyl)-diethylsilane
Bis-(4-aminophenyl)-phosphine oxide
Bis-(4-aminophenyl)-N-methylamine
Methylene bis(o-chloroaniline)
Methylene bis(o-methylaniline)
Methylene bis(o-methoxyaniline)
Bis(4-aminophenyl)diphenyl silane
Bis(4-aminophenyl)methyl phosphine oxide
4,4′-diaminoazobenzene
4,4′-diaminoazoxybenzene The polyamide-acids of formula III may be prepared by reacting, generally at between 20° C and 120° C in an anhydrous polar solvent such as dimethylformamide, dimethylacetamide, dimethylsulfoxide, N-methylpyrrolidone or pyridine a dianhydride or mixture of two dianhydrides of formula IX with an excess of diprimary diamine or a mixture of two diprimary diamines as hereinbefore defined so as to obtain a polyamide acid solution having terminal —NH$_2$ groupings

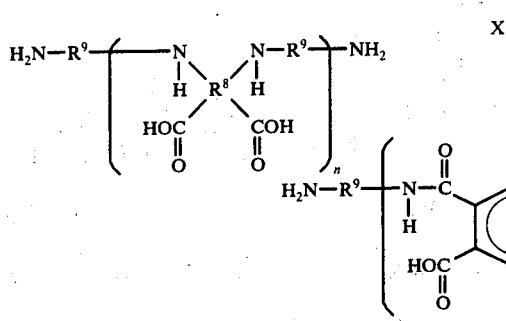

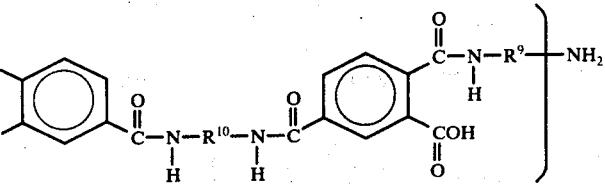

an anhydrous polar solvent such as dimethylformamide, dimethylacetamide, dimethylsulfoxide, N-methylpyrrolidone to obtain a polyamide-amide acid solution having terminal -NH$_2$ groupings and then reacting generally between 0° C to 100° C the solution thus obtained with an unsaturated anhydride of formula II wherein n, D, R$^9$ and R$^8$ are as hereinbefore defined.

A preferred group of polyimide resins or their precursor polyamide acids are those produced from (a) a suitable dianhydride (b) 4,4'-diaminodiphenylsulfide (c) a different aromatic diamine, the mole percent ratio of (b):(c) being between 1:5 and 5:1, respectively.

The preparation of the polyamide-acids of formula III is described in greater detail in U.S. Pat. Nos. 3,575,924 and 3,528,950.

The polyamide-amide acids of formula V may be prepared by reacting trimellitic anhydride or a derivative thereof, such as for example the acid chloride with an excess of a diprimary diamine or mixture of diprimary diamines as hereinbefore defined, in an anhydrous polar solvent such as dimethylformamide, N,N-dimethylacetamide, dimethylsulfoxide, N-methylpyrrolidone or pyridine so as to obtain a polyamide-amide acid solution having terminal —NH$_2$ groupings

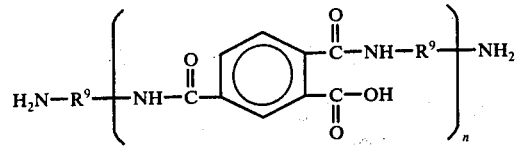

and then reacting generally at between 0° and 100° C the solution thus obtained with an unsaturated anhydride of formula II wherein R$^1$, n and D are as hereinbefore defined.

The preparation of the polyamide amide acids of formula V is described in greater detail in German Pat. No. 2,120,021.

The polyamide-amide acids of formula VI may be prepared by reacting an amide dianhydride of the formula

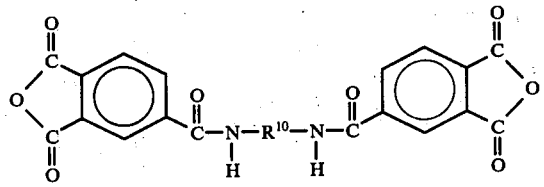

wherein R$^{10}$ is as defined hereinbefore, with a molar excess of a diprimary diamine as defined hereinbefore in and then reacting generally at between 0° C and 100° C the solution thus obtained with an unsaturated anhydride of the formula II wherein R$^1$, R$^8$, n and D are as hereinbefore defined and wherein R$^1$ and R$^8$ are independent and may be the same or different.

The preparation of the polyamide-amide acid of formula VI is described in greater detail in the copending application Ser. No. 248,838.

The quantities of anhydride and diamine to prepare the resins of formulas IX, X and XI are so chosen that the ratio $$\frac{\text{Number of Moles of Diamine}}{\text{Number of Moles of Anhydride}}$$

is in a range of from 2:1 to 1.01:1 and more preferably from 2:1 to 1.1:1.

The quantity of monoanhydride of formula II must be sufficient to introduce a number of anhydride groupings equal to the number of —NH$_2$ groupings of the resins of formulas X, XI and XII.

The polyamide-acid precursor resins of formulas III, V and VI have very good solubility in polar organic solvents such as Dimethylsulfoxide
N-methyl-2-pyrrolidone
Tetramethyl urea
Pyridine
Dimethylsulfone
Hexamethylphosphoramide
Tetramethylene sulfone
Formamide
N-methylformamide
Butyrolactone
Dimethylformamide
Dimethylacetamide The solvents can be used alone, in combination with other solvents, or in combination with poor solvents or non solvents such as benzene, benzonitrile, dioxane, xylene, toluene and cyclohexane.

Solutions may be prepared containing up to 50% by weight of the polyamide-acid precursor resins of formulas III, V and VI and fluxes combined. The resins and fluxes may be used directly from solution to form laminates for printed circuit boards, coatings for decorative and electrical purposes, films and adhesives. The polyamide-acid precursors and the fluxes may be precipitated from their solutions by a diluent such as water, a hydrocarbon or a ketone such as acetone. The powders thus obtained may be further processed using conventional plastic processing methods such as compression, transfer and injection molding. Alternatively, the polyamide-acid resin precursors may be precipitated from solution and the fluxes added to the resin powder after which the mixture is further processed.

The conversion of the polyamide acid precursors of formulas III, V and VI into their corresponding polyimide of formula IV and polyamide-imides of formulas VII and VIII respectively may be affected by thermal and/or chemical means. Thus, the polyamide-acid resin precursors may be subjected to a cyclizing dehydration which consists of treating the resin with a dehydrating agent such as acetic anhydride alone or in combination with a tertiary amine catalyst such as pyridine or heating the precursor resins between 80° C and 180° C.

The fluxes may be added to the dry isolated powdered polyimides or the polyamide-imides by standard dry blending techniques and fabricated as discussed above. For those particular polyimides of formula IV and the polyamide-imides of formulas VII and VIII which are soluble in the aforementioned dipolar solvents, the fluxes may be added to a solution of imidized resin and the resin fabricated into laminates, coatings, adhesives, molding compositions, etc.

Other appropriate ingredients may be added to the compositions of this invention such as fillers, dyes, pigments, thermal and UV stabilizers and the like, depending on the end use.

To further illustrate the nature of this invention and the process employed in preparing the compositions, the following examples are given below.

EXAMPLE 1

N,N'-p-aminophenyl sulfone bis(bicyclo [2.2.1]hept-5-ene-2,3-dicarboxylic imide)

A three neck, 20 ml flask equipped with a stirrer, addition funnel, heating mantle and Dean-Stark trap was charged with 100 ml of toluene and 32.8 gm (0.20 mole) 5-norborene-2,3-dicarboxylic anhydride (Nadic anhydride). The mixture was heated to reflux, giving a clear solution. A solution of 24.8 gm (0.10 mole) of 4,4'-diaminodiphenylsulfone in 50 ml of DMF was then added dropwise to the reaction flask over 1 hour. The mixture was maintained at reflux until the theoretical amount of water had been collected in the Dean-Stark trap (approximately 4 hours). Toluene was then allowed to distill off until a heavy slurry was obtained. The slurry was removed from the flask, triturated with toluene, filtered and vacuum dried. A white solid was obtained which had a melting point of 312°–315° C.

In a similar manner, by substituting for 4,4'-diaminodiphenylsulfone an equivalent amount of the following diamines, (a) 4,4'-diaminodiphenylsulfide
(b) 2,4-toluenediamine
(c) m-phenylenediamine
(d) 4,4'-diaminodiphenyl ether
(e) p-phenylenediamine
(f) 3,3'-diaminodiphenylsulfone
(g) 1,6-diaminohexane
(h) 2,6-bis-(2-aminophenyl)-aniline
(i) 4,4'-diaminodiphenyl disulfide
(j) 2-diphenylamino-4,6-bis(m-aminoanilino)-s-triazine there is respectively obtained the following:

(a) N,N'-p-aminophenylsulfide bis(5-norborene-2,3-dicarboxylic imide), m.p. 265° C–266° C (b) N,N'-2,4-diaminotoluene bis(5-norbornene-2,3-dicarboxylic imide) softens at 75° C
(c) N,N'-m-phenylene diamine bis(5-norbornene-2,3-dicarboxylic imide) m.p., 247° C–248° C
(d) N,N'-p-aminophenylether bis(5-norbornene-2,3-dicarboxylic imide) m.p. 266° C–267° C
(e) N,N'-p-phenylenediamine bis(5-norbornene-2,3-dicarboxylic imide) m.p. >400° C
(f) N,N'-m-aminophenylsulfone bis(5-norbornene-2,3-dicarboxylic imide) m.p. 265° C–266° C
(g) 1,6-diaminohexane bis(5-norbornene-2,3-dicarboxylic imide) m.p. 134° C–137° C
(h) 2,6-bis-(2-aminophenyl)aniline bis(5-norbornene-2,3-dicarboxylic imide) m.p. 235° C–238° C
(i) N,N'-(p-aminophenyl disulfide)bis(5-norbornene-2,3-dicarboxylic imide) m.p. 198° C–200° C
(j) N,N'-bis{2-diphenylamino-4,6-bis(m-aminoanilino)-triazine}bicyclo[2.2.1]hept-5-ene-2,3-dicarboxylic imide m.p. 148° C–150° C

EXAMPLE 2

By essentially following the procedure of Example 1 and substituting for the 4,4'-diaminodiphenylsulfone and Nadic anhydride an equivalent amount of the following diprimary diamines and unsaturated anhydrides (a) 4,4'-diaminodiphenylmethane + 5-methyl-5-norbornene-2,3-dicarboxylic anhydride (Methyl Nadic anhydride)
(b) 4,4'-diaminodiphenylether + 5-methyl-5-norbornene-2,3-dicarboxylic anhydride
(c) m-phenylenediamine + 5-methyl-5-norbornene-2,3-dicarboxylic anhydride
(d) 4,4'-diaminodiphenylmethane + 2-methyl-5-norbornene-2,3-dicarboxylic anhydride
(e) 4,4'-diaminodiphenylmethane + hexachloro-5-norbornene-2,3-dicarboxylic anhydride there is respectively obtained the following compounds:

(a) N,N'-p-aminophenylmethane bis(5-methyl-5-norbornene-2,3-dicarboxylic imide) softening point, 90° C
(b) N,N'-p-aminophenylether bis(5-methyl-5-norbornene-2,3-dicarboxylic imide) softening point, 110° C–114° C
(c) N,N'-m-phenylene diamine bis(5-norbornene-2,3-dicarboxylic imide) softening point, 80° C
(d) N,N'-p-aminophenylmethane bis(2-methyl-5-norbornene-2,3-dicarboxylic imide) m.p. 140° C–147° C
(e) N,N'-aminophenylmethane bis(hexachloro-5-norbornene-2,3-dicarboxylic imide) m.p. 190° C–210° C

EXAMPLE 3 m-phenylene diamine bis(maleimide)

To a 3 neck, 200 ml flask equipped with a stirrer and water bath was added 17.7 gm (0.16 mole) of m-phenylene diamine, 15 gm (0.18 mole) of anhydrous sodium acetate and 50 ml of DMF. The mixture was heated to 48° C. To the resulting slurry was added 32 gm (0.34 mole) of maleic anhydride, forming a clear yellow solution. After about 5 minutes, 42 gm (0.41 mole) of acetic anhydride was added. Stirring was continued for 3 hours at 45° C, after which time a heavy yellow slurry had formed. The mass was poured into a rapidly stirred ten fold excess of water. The bright yellow solid obtained was filtered off and vacuum dried and had a melting point of 197°–199° C.

In a similar manner, by substituting for m-phenylene diamine an equivalent amount of the following amines (a) aniline
(b) allylamine
(c) p-aminobenzoic acid
(d) m-nitroaniline
(e) p-nitroaniline
(f) 4,4'-diaminodiphenylmethane
(g) 2,4-toluenediamine there is respectively obtained the following compounds:

(a) N-phenyl maleimide; m.p. 90° C
(b) N-allyl maleimide; m.p. 47° C
(c) N-(p-carboxyphenyl)maleimide; m.p. 234° C
(d) N-(m-nitrophenyl)maleimide; m.p. 126° C–127° C
(e) N-(p-nitrophenyl)maleimide; m.p. 167° C–170° C
(f) 4,4'-diaminodiphenylmethane bis(maleimide); m.p. 150° C–152° C
(g) 2,4-toluenediamine bis(maleimide); m.p. 197° C–198° C By essentially following the procedure of Example 3 and substituting for the m-phenylene diamine and m-phenylene diamine and maleic anhydride an equivalent amount of the following amines and unsaturated anhydrides (a) 4,4'-diaminodiphenylether + dichloro maleic anhydride
(b) 4,4'-diaminodiphenylether + citraconic anhydride
(c) 4,4'-diaminodiphenylether + 7-oxabicyclo[2.2.1]hept-5-ene-2,3-dicarboxylic anhydride (oxynadimide)

there is respectively obtained the following compounds:

(a) 4,4'-diaminodiphenylether bis(dichloromaleimide)
(b) N,N'-p-aminophenylether bis(citraconimide)
(c) N,N'-p-aminophenylether bis(7-oxabicyclo[2.2.1]hept-5-ene-2,3-dicarboxylic imide).

EXAMPLE 4

N,N'-p-aminodiphenylmethane bis(5-norborene-2,3-dicarboxylic amide acid

To a 3000 ml. flask equipped with a stirrer, dropping funnel and thermometer was added 900 ml. of chloroform and 164 gms of 5-norbornene-2,3-dicarboxylic anhydride (Nadic anhydride) at a temperature of 10° C. To the reaction mixture was slowly added 900 ml. of chloroform containing 99 gm of 4,4'-diaminodiphenylmethane. The mixture was stirred for about 3 hours after which the product was filtered from the reaction mixture, washed with chloroform and dried in a vacuum oven at 25° C. The product had a melting point of 108°–110° C.

In a similar manner, by substituting for 4,4'-diaminodiphenylmethane and Nadic anhydride an equivalent amount of the following diprimary diamines and unsaturated anhydrides:

(a) 4,4'-diaminodiphenylsulfide + Nadic anhydride
(b) 4,4'-diaminodiphenylmethane + 5-methyl-5-norbornene-2,3-dicarboxylic anhydride
(c) m-phenylenediamine + Nadic anhydride
(d) m-phenylenediamine + maleic anhydride
(e) 4,4'-(p-aminophenyl)disulfide + Nadic anhydride there is respectively obtained the following compounds:

(a) N,N'-p-aminophenylsulfide bis(5-norbornene-2,3-dicarboxylic amide acid
(b) N,N'-p-aminophenylmethane bis(5-methyl-5-norbornene-2,3-dicarboxylic anhydride
(c) N,N'-m-phenylene bis(5-norbornene-2,3-dicarboxylic anhydride
(d) N,N'-m-phenylene bis(maleimide)
(e) N,N'-(p-aminophenyl)disulfide bis(5-norbornene-2,3-dicarboxylic amide acid

EXAMPLE 5

N-phenyl-5-norbornene-2,3-dicarboxylic imide

A 100 ml. Erlenmeyer flask was charged with 25.7 gm of N-phenyl Nadamide acid and 50 ml of $CHCl_3$, giving a heavy white slurry. To this was added 12 gm of acetic anhydride and 9 gm of pyridine. The solid slowly dissolved, giving a light yellow solution after 1 and ½ hours at R.T. The solvent was removed in vacuo and the solid so obtained was recrystallized from MeOH to yield the desired product which had a melting point of 143°–145° C.

EXAMPLE 6

4,4'-diaminodiphenylmethane and Nadic anhydride were dissolved in dimethyl formamide under a nitrogen atmosphere at about 25° C. To this solution was added portionwise 3,3',4,4'-benzophenone tetracarboxylic dianhydride. The reaction mixture was stirred for several hours and a clear viscous solution was obtained. The mole ratio of 4,4'-diaminodiphenylmethane, Nadic anhydride and benzophenone dianhydride was 1.5:1:1 respectively. The solids were adjusted to yield a final resin solution of about 40% solids. The polymer powder was obtained by spray drying.

The resin powder obtained had a softening point of 230° C and showed no signs of flow at this temperature.

EXAMPLE 7

To the resin powder obtained from Example 6 was added various amounts of N,N'-m-phenylene bis (maleimide). The mixtures of powders were ground in a mortor and pestle and the point of initial softening and the point at which the material gave a melt were determined on a Fisher-John melting block

| Gms of Flux Gms Resin | Softening Point ° C | Melting Point ° C |
|---|---|---|
| 0:1 | 230 | — |
| 1:1 | 168 | 173 |
| 1:3 | 172 | 183 |
| 1:5 | 180 | 190 |

EXAMPLE 8

By the use of mixtures of at least two different fluxes, it is possible to control the temperatures at which the resin melts. This may be exemplified as follows: Nine different samples of the resin powders obtained according to the procedure of Example 6 were weighed out and then proportional mixtures of two different fluxes were added. The mixtures of powders were then ground in a mortor and pestle and the point of initial softening and the point at which the material gave a clear melt were determined on a Fisher Johns melting block. All samples contained 25% fluxing compound based on the amount of resin powder.

| %4,4'-N,N'-diphenylmethane bis(maleimide) % N-phenylmaleimide | Softening Point °C | Melting Point °C |
|---|---|---|
| 100/0 | 158 | 176 |
| 80/20 | 133 | 168 |
| 75/25 | 143 | 170 |
| 67/33 | 134 | 162 |
| 50/50 | 105 | 148 |
| 33/67 | 132 | 153 |
| 25/75 | 108 | 142 |
| 20/80 | 99 | 138 |
| 0/100 | 92 | 128 |
| 0/0 | > 280 | |

EXAMPLE 9

(a) To a resin solution prepared according to Example 6, was added 25 weight percent of N,N'-p-aminophenylether bis(5-methyl-5-norbornene-2,3-dicarboxylic imide) based on the weight of resin. The resin powder and flux was isolated by water coagulation. The powder so obtained gave a clear melt at 220° C. The resin powder without flux, obtained in a similar fashion, does not soften below 280° C.

Similarly, 25 weight percent of 4,4'-diaminodiphenylmethane bis(citraconimide) and N,N'-bis{2-diphenylamino-4,6-bis(m-aminoanilino)triazine}bicyclo[2.2.1]hept-5-ene-2,3-dicarboxylic imide based on the weight of the resin was added to the resin solution of Example 6. The resin powder and flux thus obtained had a melting point of 130° C.

(b) The resin powder prepared according to Example 6, was dry mixed separately with each of several fluxing compounds and the softening points were measured.

| Fluxing Compound | % of Flux Based on Wt. of Resin | Softening Point °C |
|---|---|---|
| Blank-resin only | | > 280 |
| 2,4-toluenediamine bis (maleimide) | 50 | 135 |
| N,N'-diaminodiphenyl disulfide bis(5-norbornene-2,3-dicarboxylic imide | 12 | 220 |
| N,N'-p-aminophenylsulfide bis (5-norbornene-2,3-dicarboxylic imide) | 12 | 180 |
| N,N'-p-aminophenylmethane bis (5-methyl-5-norbornene-2,3-dicarboxylic imide) | 50 | 110 |
| N,N'-m-phenylene diamine bis (5-norbornene-2,3-dicarboxylic imide) | 50 | 95 |
| N,N'-p-aminophenylether bis (5-methyl-5-norbornene-2,3-dicarboxylic imide) | 50 | 125 |
| N,N'-m-phenylene diamine bis(5-methyl-5-norbornene-2,3-dicarboxylic imide) | 50 | 95 |
| N,N'-p-aminophenylsulfide bis (5-norbornene-2,3-dicarboxylic amide acid) | 5 | 260-265 |
| | 20 | 233-238 |
| | 33 | 180 |
| N,N'-(p-aminophenylmethane bis (5-norbornene-2,3-dicarboxylic amide acid) | 5 | 240-250 |
| | 15 | 235-240 |
| | 25 | 198-212 |

EXAMPLE 10

Laminates prepared from the resin solution obtained according to Example 6 could not be processed by conventional autoclave techniques. Attempts to do so gave unconsolidated, void filled parts with no mechanical strength or integrity. When 25 weight percent of m-phenylene bis(maleimide) was added to the varnish, laminates could be prepared using autoclave techniques. Using the processing conditions of 260° C and 200 psi, a dense, low void laminate was obtained which had the following mechanical properties:

Flexural Strength — 70,600 psi
Void Content — 3%

Laminates prepared from a resin solution prepared according to Example 6 containing 12 weight percent of 4,4'-diaminodiphenyl sulfide bis (Nademide acid) cessed in an autoclave at 260° C and 200 psi had the following mechanical properties:

Flexural Strength — 57,000 psi
Short Beam Shear Strength — 7,900 psi
Void Content — 7%

A more detailed description of the preparation of laminates is given as follows:

Prepreg Preparation

A Sauter prepregging oven was threaded with a 6 inch wide tape of 181 E style glass cloth with A1100 finish and the oven was equilibrated at 110° C. The tape was passed into a coating trough containing the varnish. From the trough the tape passed through a nip role set at a gap of 30 mil., through the oven (residence time, 10 min.) and on to a take up roll.

The prepregs prepared were then cut into 6 inch × 6 inch pieces and stacked 12 ply deep. The stack was placed in the autoclave and processed as follows: The autoclave was evacuated to a 29 inch vacuum and heated rapidly to 165° C and held 45 minutes at this temperature. The autoclave was pressurized to 200 psi with N₂ and the temperature increased rapidly to 238° C. The temperature was raised at 1° C/min. from 238° C to 260° C and held 1 hour at 260° C. The autoclave was cooled to room temperature under 200 psi pressure and the samples were withdrawn for testing.

EXAMPLE 11

To a resin solution prepared according to Example 6 was added 25% by weight based on the weight of the resin of N,N'-bis{2-diphenylamino-4,6-bis(m-aminoanilino)triazine}bicyclo[2.2.1]hept-5-ene-2,3-dicarboxylic imide.

Prepregs made from this varnish were used to prepare a laminate using the procedure of Example 10 except that the final temperature and pressure used to prepare the laminate was 180° C and 90 psi. The laminates prepared had the following mechanical properties:

Short Beam Shear Strength — 7,900 psi
Void Content — 12%

Attempts to prepare laminates from the resin under these conditions gave unconsolidated void filled parts with no mechanical strength or integrity.

EXAMPLE 12

A flask is charged with 95.04 gms of 4,4'-diaminodiphenylmethane, 25.92 gms of 4,4'-diaminodiphenylsulfide, 98.5 gms Nadic anhydride and 200 ml of dimethylformamide under a nitrogen atmosphere. A slurry of 96.6 gms of 3,4,3',4'-benzophenone tetracarboxylic dianhydride and 154.8 gms of N,N'-p-aminophenylmethane bis(5-methyl-5-norbornene-2,3-dicarboxylic imide) in 230 ml of dimethylformamide was then added in portions to the reaction mixture. The reaction was continued for 4 hours. A portion of the resin was precipitated from solution by coagulation into water. The resin powder containing the flux softens at a lower temperature than the resin containing no flux.

The resin powder containing the flux may be molded in a cavity mold at 260° C and a pressure of about 3,000 psi.

EXAMPLE 13

A flask was charged under a nitrogen atmosphere with 59.4 gms of 4,4'-diaminodiphenylmethane, 70 ml. of dimethylformamide and stirred until the reaction mixture became homogeneous. To this mixture was added 32.8 gm of Nadic anhydride. A slurry containing 64.4 gms of 3,4,3',4'-benzophenone tetracarboxylic dianhydride and 40 gm of m-phenylene bis(maleimide) in 100 ml, dimethylformamide was added to the reaction mixture over a 15 minute period. An additional 100 ml of dimethylformamide was added and the mixture was allowed to stir about 16 hours at about 25° C. On heating to 50°–55° C for several minutes, a clear solution was obtained.

The resin powder was obtained by precipitation from solution with water and dried under reduced pressure at 70° C.

The resin containing the m-phenylene bis (maleimide) flux had a softening of (170° C).

In a similar manner, a resin was prepared wherein an equivalent amount of N,N'-2,4-diamino-toluene bis(5-norbornene-2,3-dicarboxylic imide) was substituted for the m-phenylene bis(maleimide) in the above procedure. The resin powder containing this flux softened at 230° C.

EXAMPLE 14 p-phenylene diamine is reacted with acetic anhydride to form the following compound:

This compound is then reacted with two molar equivalents of trimellitic anhydride to form the following dianhydride compound:

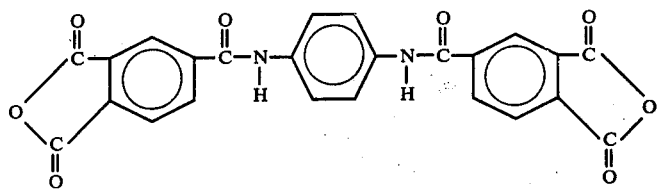

4,4'-diaminodiphenylmethane is reacted with this dianhydride and Nadic anhydride in dimethylformamide and at about 25° C, all compounds being at equivalence to yield the polyamic acid precursor having the formula

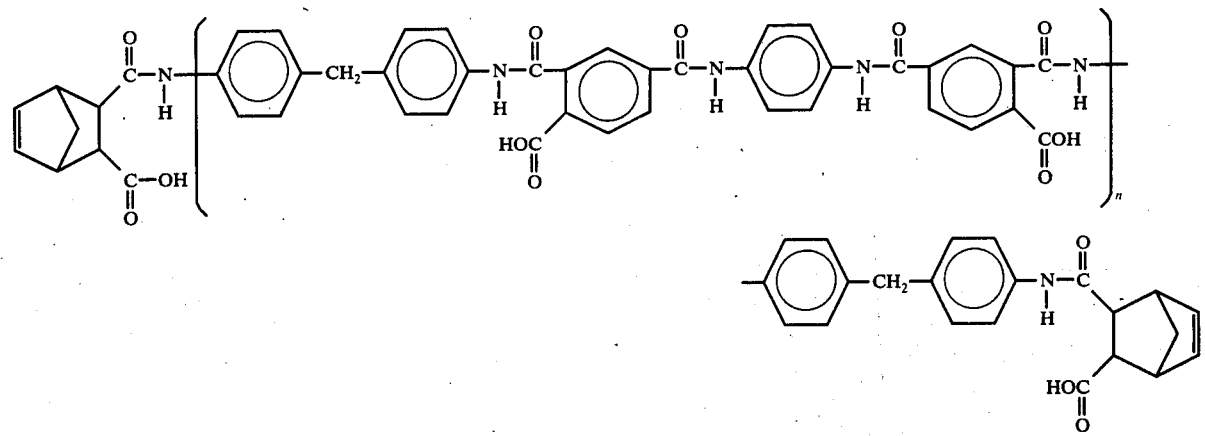

Upon heating the above polyamic acid precursor to temperatures of about 200° C, the following polyamide imide is formed:

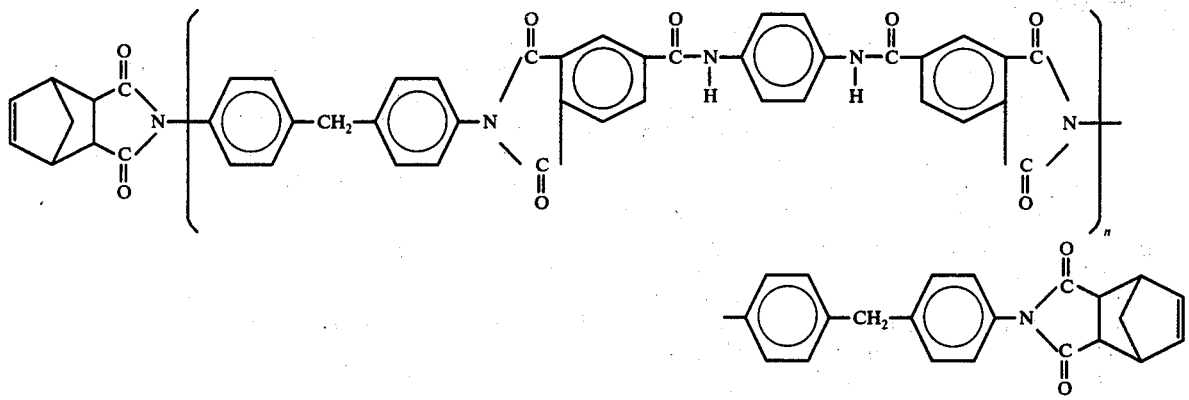

The polyamic acid can also be converted to the polyamide imide by treating the polyamic acid with pyridine/acetic anhydride mixture. The polyamide-imide powder is obtained by coagulation of the polymer solution into water.

The polymer powder when dry mixed separately with each of the following fluxing compounds:

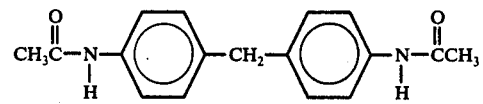

a polyamide imide is obtained having the formula

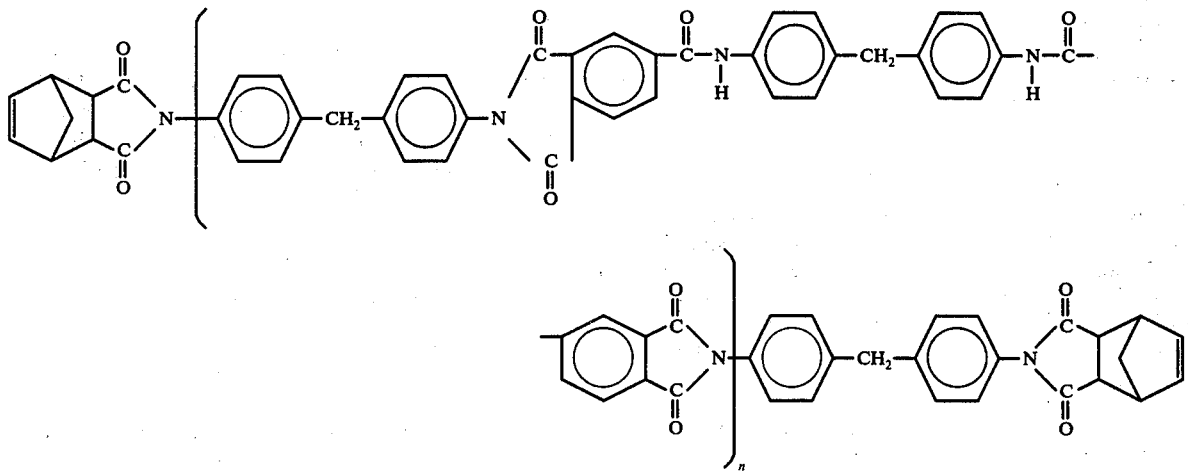

(a) N,N'-p-aminophenylsulfide bis(5-norbornene-2,3-dicarboxylic imide)
(b) 2,6-bis-(2-aminophenyl)aniline bis(5-norbornene-2,3-dicarboxylic imide)
(c) N,N'-p-aminophenylether bis(5-methyl-5-norbornene-2,3-dicarboxylic imide)
(d) N,N'-p-amino-phenylmethane bis(hexachloro-5-norbornene-2,3-dicarboxylic imide)
(e) N-allyl (maleimide)
(f) 4,4'-diaminodiphenylmethane bis(maleimide)
(g) 4,4'-diaminodiphenylmethane bis(dichloromaleimide)
(h) 4,4'-diaminodiphenylmethane bis(citraconimide)
(i) N,N'-p-aminophenylether bis(citraconimide) at a concentration of 15 weight percent, will yield resins which soften at a lower temperature than the base resin which does not contain the fluxing compound.

In a similar manner, if one substitutes for the reaction product of p-phenylene diamine and acetic anhydride in the above reaction, with the compound resulting from the reaction of 4,4'-diaminodiphenylmethane and acetic anhydride, i.e., The polymer powder when dry mixed separately with each of the following fluxing compounds (a) N,N'-2,4-diaminotoluene bis(5-norbornene-2,3-dicarboxylic imide)
(b) N,N'-p-aminophenylether bis(5-norbornene-2,3-dicarboxylic imide)
(c) N,N'-p-aminophenylether bis(5-methyl-5-norbornene-2,3-dicarboxylic imide)
(d) N,N'-p-amino-phenylmethane bis(hexachloro-5-norbornene-2,3-dicarboxylic imide)
(e) N-phenyl maleimide
(f) 2,4-toluenediamine bis(maleimide)
(g) 4,4'-diaminodiphenylmethane bis(dichloro maleimide)
(h) 1,6-diaminohexane bis(5-norbornene-2,3-dicarboxylic imide)
(i) 2,6-bis-(2-aminophenyl)aniline bis(5-norbornene-2,3-dicarboxylic imide)

at a concentration of 20 weight percent, will yield resins which soften at a lower temperature than the base resin which does not contain the fluxing compound.

EXAMPLE 15

To a 3 liter flask, under a nitrogen atmosphere, was added 98.14 gm of 4,4'-diaminodiphenylmethane, 500 ml dimethylacetamide and 54.17 gm of Nadic anhydride. To the reaction mixture was added 69.49 gm of solid trimellitic acid chloride and 325 ml of dimethylacetamide. Stirring was continued for about 16 hours at 25° C after which 250 ml of acetic anhydride and 340 ml of pyridine was added to the reaction mixture. A clear solution of the polyamide-imide was obtained. The polymer was coagulated into water and dried for 20 hours at 70° C under a vacuum of 70 mm of mercury.

The resin powder was dry mixed separately with each of several fluxing compounds and the softening and flow (melting) points were measured as follows:

| Fluxing Compound | % Based on Wt. of Resin | Softening Point ° C | Flow Point ° C |
|---|---|---|---|
| m-phenylene diamine bis (maleimide) | 5 | 190 - 195 | 205 |
| 4,4'-diaminodiphenyl-methane bis(maleimide) | 10 | 190 | 205 |
| N,N'-2,4-diaminotoluene bis(5-norbornene-2,3-dicarboxylic imide) | 10 | 190 | — |
| 4,4'-diaminodiphenyl-sulfide bis(maleimide) | 10 | 198 | 212 |
| blank - resin with no flux | | 197 | 230 |

EXAMPLE 16

To 400 ml of methyl cellosolve under a nitrogen atmosphere at 25° C was added 74.3 gm. 4,4'-diaminodiphenylmethane, 205.9 gm. of 2-diphenylamino-4,6-bis(m-aminoanilino)-s-triazine and 82.0 gm of Nadic anhydride. To the slurry was added 125 ml of methyl cellosolve to wash in the previous materials. A slurry containing 75 ml of methyl cellosolve and 161.0 gm of 3,4,3',4'-benzophenone tetracarboxylic dianhydride was added to the reaction mixture followed with an additional 40 ml of methyl cellosolve. The mixture was stirred for about 16 hours after which a clear viscous solution containing 45% solids was obtained.

To a portion of the resin solution was added 12 weight percent of 4,4'-diaminodiphenylmethane bis(5-methyl-5-norbornene-2,3-dicarboxylic anhydride. Prepregs and laminates were prepared using the procedure of Example 10 except that the maximum temperature and pressure used during lamination in the autoclave was 400° F and 90 psi.

Laminates prepared from the resin solution containing no fluxing compound had the following room temperature mechanical properties:

Flexural Strength — 21,000 psi Voids 21%
Flexural Modulus — 1,400,000 psi Resin 23%
Short Beam Shear Strength — 1,400 psi Laminates prepared from the resin solution containing the fluxing compound had the following room temperature mechanical properties:

Flexural Strength — 57,600 psi Voids 12%
Flexural Modulus — 2,690,000 psi Resin 22%
Short Beam Shear Strength — 1,400

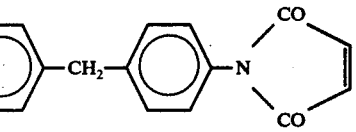

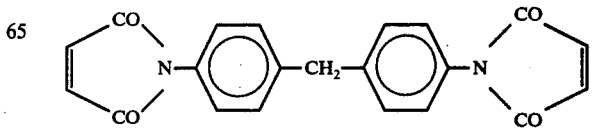

What is claimed is:
1. A composition of matter comprising
   (a) a polyimide resin containing olefinic unsaturated end groups, and
   (b) from about 10% to about 35% by weight based on the weight of (a) of an olefinic unsaturated imide compound of the formula

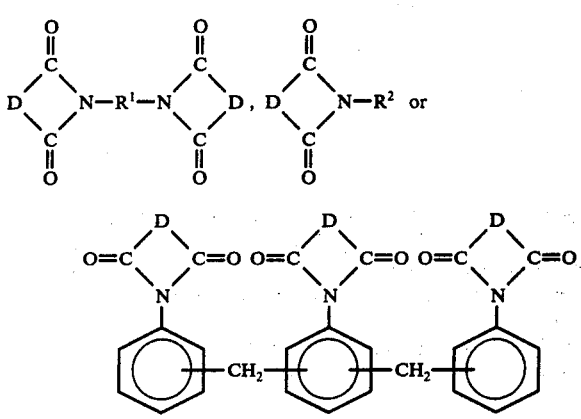

wherein
$R^1$ is an alkylene group containing from 2 to 12 carbon atoms; a cycloalkylene group containing from 4 to 6 carbon atoms, an arylene group selected from phenylene, xylylene, tolylene, biphenylene, naphthylene, a substituted arylene group of the formula

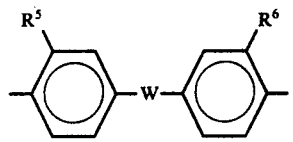

wherein W is sulfur, carbonyl, —SS—, O, sulfonyl, $R^5$ and $R^6$ are independent and each is hydrogen, chloro, bromo, a (lower)alkyl group containing from 1 to 5 carbon atoms, or a (lower) alkoxy group containing from 1 to 5 carbon atoms; or a group having the formula

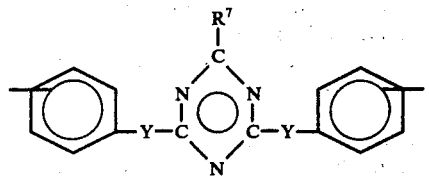

where Y is a covalent bond or —NH—, and $R^7$ is phenyl, piperidino, H, diphenylamino or di(lower)alkyl amino;
$R^2$ is an alkyl group of from 1 to 8 carbon atoms, an alkenyl group of from 3 to 18 carbon atoms, an aryl group, an alkaryl group, nitrophenyl and aminophenyl;
D is a divalent radical containing olefinic unsaturation having the formula

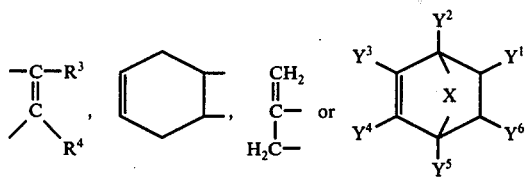

wherein
R³ is hydrogen, methyl, bromo or chloro;
R⁴ is hydrogen, bromo or chloro;
Y¹–Y⁶ inclusive is selected from the group consisting of hydrogen, bromine, chlorine, nitro, phenyl, alkyl of from 1 to 6 carbon atoms;
X is carbonyl, oxygen, sulfur, chloro or bromo substituted methylene, alkylidene of from 1 to 6 carbon atoms, and benzylidene.

2. A composition according to claim 1 wherein
(a) is a polyimide resin having the formula

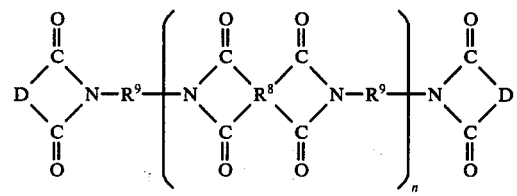

wherein
R⁸ is a tetravalent aliphatic, cycloaliphatic, aromatic or heterocyclic radical containing at least 2 carbon atoms;
R⁹ is an alkylene group containing from 2 to 12 carbon atoms; a cycloalkylene group containing from 4 to 6 carbon atoms; an arylene group selected from phenylene, xylylene, tolylene, biphenylene, naphthylene, substituted arylene groups of the formula

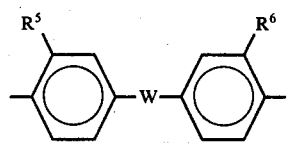

wherein W is sulfur, carbonyl,

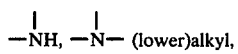

—SS—, —O—,

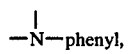

sulfonyl, an alkylene group of from 1 to 3 carbon atoms, a di(lower)alkyl silyl group containing from 1 to 5 carbon atoms, a diphenylsilyl group,

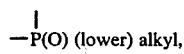

said lower alkyl containing from 1 to 5 carbon atoms, —N=N—,

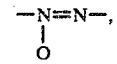

R⁵ and R⁶ are independent and each is hydrogen, chloro, or bromo, a (lower) alkyl group containing from 1 to 5 carbon atoms, a (lower) alkoxy group containing from 1 to 5 carbon atoms or a group having the formula

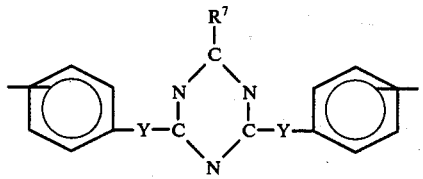

where Y is a covalent bond or —NH—, and R⁷ is phenyl, piperidino, H, diphenylamino or di(lower)alkyl amino;
n is an integer of from 1 to 100;
D is a divalent radical containing olefinic unsaturation selected from the group having the formula

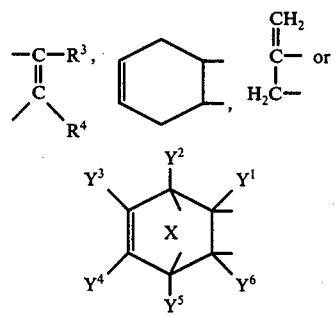

wherein
R³ is hydrogen, methyl, bromo or chloro;
R⁴ is hydrogen, bromo or chloro;
Y¹–Y⁶ inclusive is selected from the group consisting of hydrogen, bromine, chlorine, nitro, phenyl, alkyl of from 1 to 6 carbon atoms;
X is carbonyl, oxygen, sulfur, chloro or bromo substituted methylene, alkylidene of from 1 to 6 carbon atoms, and benzylidene.

3. A composition of claim 2 wherein (a) is a polyimide resin wherein
D is a divalent radical containing olefinic unsaturation having the formula

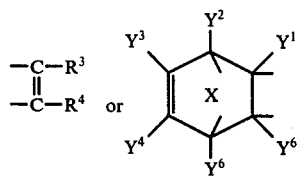

wherein
R³ is hydrogen, methyl, bromo or chloro;
R⁴ is hydrogen, bromo or chloro;
X is carbonyl, oxygen, sulfur, chloro or bromo substituted methylene, alkylidene of from 1 to 6 carbon atoms, and benzylidene;

$Y^1$–$Y^6$ inclusive is selected from the group consisting of hydrogen, bromine, chlorine, alkyl of from 1 to 6 carbon atoms; and $n$ is an integer of from 1 to 15.

4. A composition of claim 3 wherein (a) is a polyimide resin where

D is a divalent radical containing olefinic unsaturation having the formula

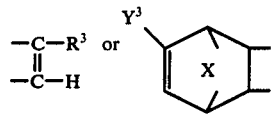

wherein
$R^3$ is hydrogen or methyl;
$Y^3$ is hydrogen or methyl; and
X is methylene or oxygen.

5. A composition according to claim 4 wherein (a) is a polyimide resin where
D has the formula

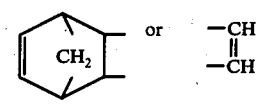

$R^9$ has the formula

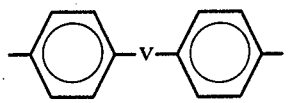

wherein V is methylene, O or S;
$R^8$ has the formula

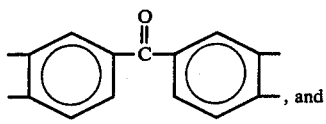

(b) is an unsaturated imide compound of the formula

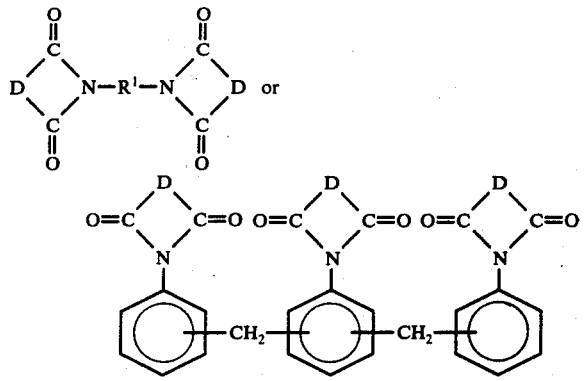

wherein D has the formula

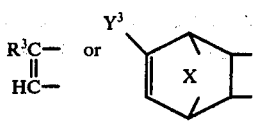

wherein
$R^3$ is hydrogen or methyl;
$Y^3$ is hydrogen or methyl;
X is methylene or oxygen; and
$R^1$ is ortho or meta phenylene or a group having the formula

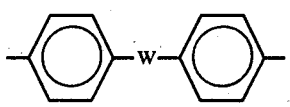

wherein W is O, or S—S or S.

6. A composition according to claim 1 wherein (a) is a polyimide resin of
(1) a dianhydride
(2) 4,4'-diaminodiphenylsulfide, and
(3) a different diamine, the mole percent ratio of (2):(3) being between about 1:5 to 5:1 respectively.

7. A composition according to claim 6 wherein said diamine is 4,4'-diaminodiphenylmethane.

8. A solution of a composition according to claim 1 in a volatile solvent for said composition.

9. A molding powder comprising the composition according to claim 1.

10. A composition according to claim 1 wherein the resin (a) is

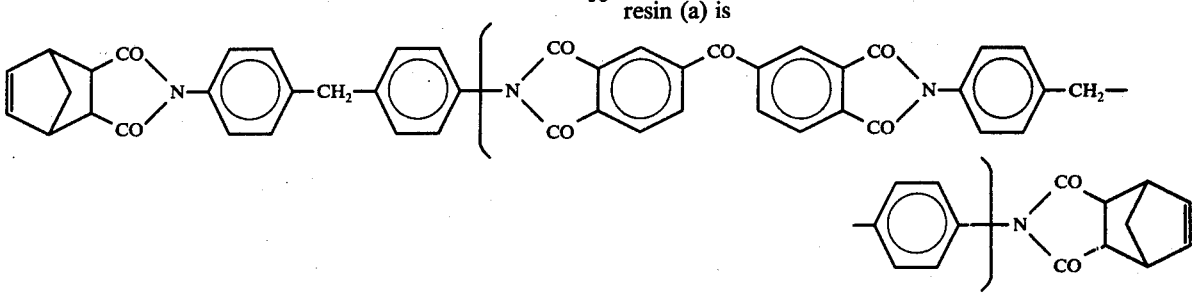

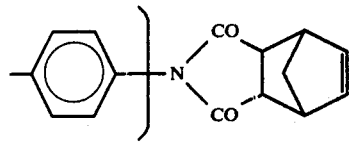

where n is 2, and the imide compound (b) is